*US008004823B2*

United States Patent
Taguchi et al.

(10) Patent No.: US 8,004,823 B2
(45) Date of Patent: Aug. 23, 2011

(54) LITHIUM ION CAPACITOR

(75) Inventors: Hiromoto Taguchi, Tokyo (JP); Nobuo Ando, Tokyo (JP); Hideki Shibuya, Tokyo (JP); Shinichi Tasaki, Tokyo (JP); Risa Miyagawa, Tokyo (JP); Yukinori Hato, Tokyo (JP); Osamu Hatozaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 374 days.

(21) Appl. No.: 12/093,528

(22) PCT Filed: Nov. 13, 2006

(86) PCT No.: PCT/JP2006/322582
§ 371 (c)(1),
(2), (4) Date: Jun. 11, 2009

(87) PCT Pub. No.: WO2007/055358
PCT Pub. Date: May 18, 2007

(65) Prior Publication Data
US 2010/0027195 A1 Feb. 4, 2010

(30) Foreign Application Priority Data

Nov. 14, 2005 (JP) .................................. 2005-329455

(51) Int. Cl.
*H01G 9/00* (2006.01)
(52) U.S. Cl. ........ 361/502; 361/504; 361/509; 361/512; 361/523; 361/528
(58) Field of Classification Search .................. 361/502, 361/503–504, 516–519, 523–525, 528–529, 361/509–512
See application file for complete search history.

(56) References Cited

U.S. PATENT DOCUMENTS

| | | | | |
|---|---|---|---|---|
| 5,498,489 A | * | 3/1996 | Dasgupta et al. | 429/152 |
| 5,877,935 A | * | 3/1999 | Sato et al. | 361/502 |
| 7,443,651 B2 | * | 10/2008 | Ando et al. | 361/503 |

(Continued)

FOREIGN PATENT DOCUMENTS

JP 8-107048 4/1996

(Continued)

OTHER PUBLICATIONS

International Search Report issued in PCT/JP2006/322582 mailed on Feb. 13, 2007, with translation (3 pages).

(Continued)

*Primary Examiner* — Nguyen T Ha
(74) *Attorney, Agent, or Firm* — Osha • Liang LLP

(57) ABSTRACT

A lithium ion capacitor includes a positive electrode made of a material capable of reversibly doping and dedoping lithium ions and/or anions; a negative electrode made of a material capable of reversibly doping and dedoping lithium ions; and an electrolytic solution made of an aprotonic organic solvent electrolyte solution of a lithium salt. When the negative electrode and/or positive electrode and a lithium ion supply source are electrochemically brought into contact, lithium ions are doped in a negative electrode and/or positive electrode. A positive electrode potential after the positive electrode and negative electrode are short-circuited is 2.0 V (vs. Li/Li$^+$) or less. The positive electrode and/or negative electrode has a current collector made of a metal foil that has many holes that penetrate through both sides and have an average diameter of inscribed circles of the through-holes of 100 μm or less.

6 Claims, 1 Drawing Sheet

U.S. PATENT DOCUMENTS

| | | | |
|---|---|---|---|
| 7,817,403 B2 * | 10/2010 | Tasaki et al. | 361/512 |
| 7,859,826 B2 * | 12/2010 | Thrap et al. | 361/502 |
| 7,920,371 B2 * | 4/2011 | Mitchell et al. | 361/502 |
| 2007/0002524 A1 | 1/2007 | Ando et al. | |

FOREIGN PATENT DOCUMENTS

| | | |
|---|---|---|
| JP | 9-55342 | 2/1997 |
| JP | 9-232190 | 9/1997 |
| JP | 11-297578 | 10/1999 |
| JP | 2002-305034 A | 10/2002 |
| JP | 2005-129924 A | 5/2005 |
| WO | 98/33227 A1 | 7/1998 |
| WO | 2004/097867 A2 | 11/2004 |
| WO | 2005/031773 A1 | 4/2005 |

OTHER PUBLICATIONS

Written Opinion issued in PCT/JP2006/322582 mailed on Feb. 13, 2007 (no translation available), 3 pages.

Notification of Transmittal of Translation of the International Prelminary Report on Patentability (Chapter I or Chapter II of the Patent Cooperation Treaty) for International Application No. PCT/JP2006/322582, mailed on May 22, 2008 (5 pages).

Office Action in Japanese Patent Application No. 2005-329455, Issued Feb. 1, 2011 (4 Pages With Machine Translation).

English Patent Abstract of JP 2005-129924 from esp@cenet, Published May 19, 2005 (1 Page).

English Patent Abstract of WO 2005/031773 from esp@cenet, Published Apr. 7, 2005 (1 Page).

* cited by examiner

FIGURE
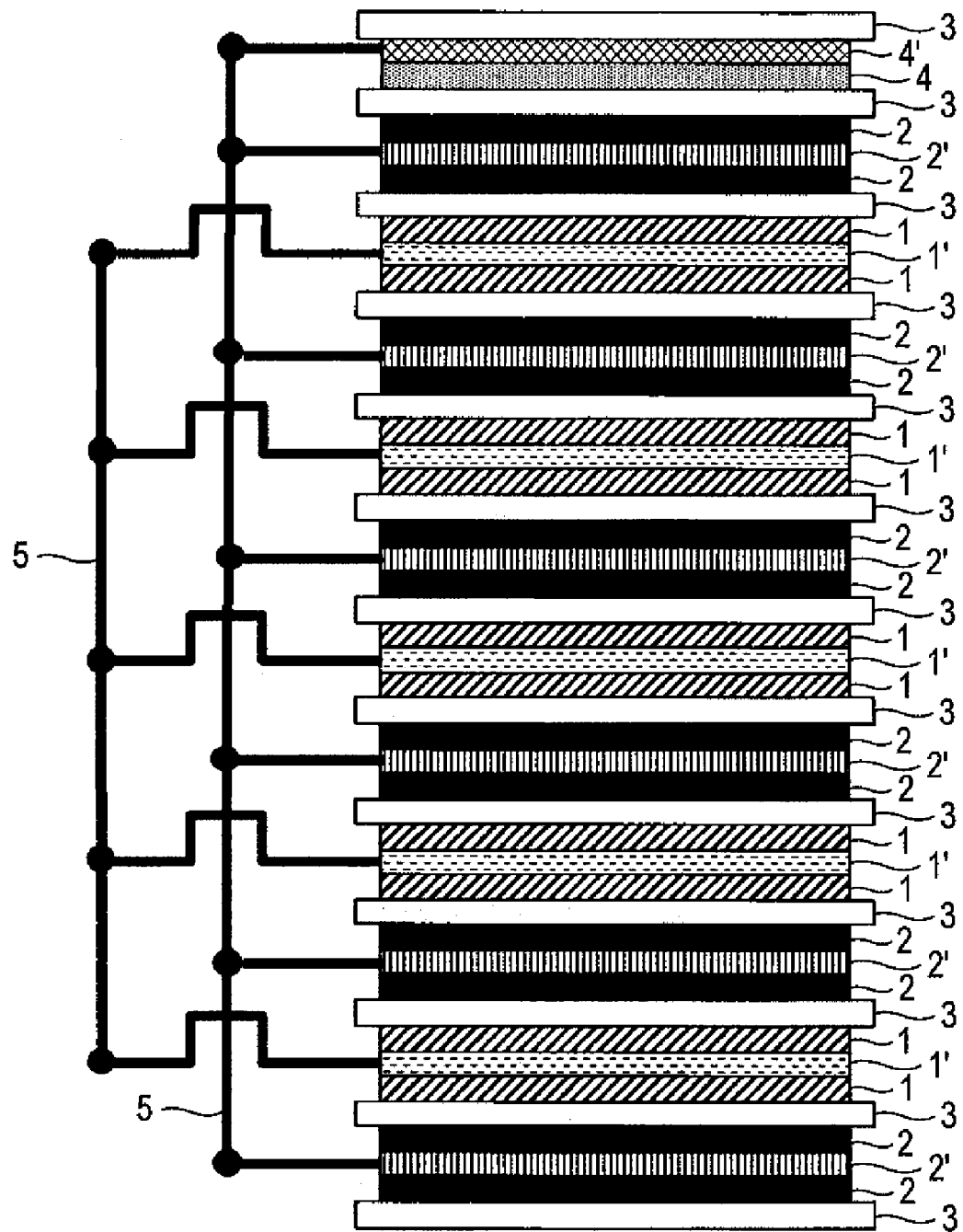

LITHIUM ION CAPACITOR

TECHNICAL FIELD

The invention relates to a lithium ion capacitor that includes a positive electrode, a negative electrode and, as an electrolyte, an aprotonic organic solvent electrolyte of a lithium salt.

BACKGROUND ART

In recent years, since a so-called lithium ion secondary battery in which a carbon material such as graphite or the like is used in a negative electrode and a lithium-containing metal oxide such as $LiCoO_2$ or the like is used in a positive electrode is high in the capacity, it is put into practical use, as a potential electric storage device, as a main power supply mainly of a note personal computer and a portable telephone. A lithium ion secondary battery is a so-called rocking chair type battery where a battery is, after assembling, charged to supply lithium ions from a lithium-containing metal oxide of a positive electrode to a negative electrode and, during discharge, lithium ions at a negative electrode are returned to a positive electrode, and is characterized in having high voltage and high capacitance.

On the other hand, under the circumstance where an environmental problem is highlighted, an electric storage device (main power source and auxiliary power source) for use in an electric automobile or a hybrid automobile that will replace a gasoline engine is under active development. Furthermore, as an electric storage device for use in an automobile, a lead battery has been used. However, since a vehicular electric equipment and instrument have been improved, from the view points of energy density and output density, a novel electric storage device is in demand.

As such a novel electric storage device, the lithium ion secondary battery and an electric double layer capacitor are gathering attention. However, while the lithium ion secondary battery is high in the energy density, there remain problems in the output characteristics, safeness and cycle lifetime. On the other hand, an electric double layer capacitor, although it is used as a memory backup power source of an IC and LSI, is smaller in the discharge capacity per one charge than a battery. However, the electric double layer capacitor is excellent in the instantaneous charge and discharge characteristics and has such high output characteristics as that charges and discharges of several tens thousands cycles or more are withstood, which a lithium ion secondary battery lacks, and the maintenance free property.

An electric double layer capacitor has such advantages as mentioned above. However, the energy density of an existing general electric double layer capacitor is substantially 3~4 Wh/l, that is, substantially two digits smaller than that of a lithium ion secondary battery. When an electric automobile is considered, it is said that the energy density of 6~10 Wh/l is necessary for putting into practical use and 20 Wh/l is necessary for commercializing.

As an electric storage device compatible to applications where such high energy density and high output characteristics are necessary, recently, an electric storage device called as a hybrid capacitor in which electricity storage principles of a lithium ion secondary battery and an electric double layer capacitor are combined is gathering attention. In a hybrid capacitor, usually, a polarizable electrode is used in a positive electrode and a non-polarizable electrode is used in a negative electrode. The hybrid capacitor is gathering attention as an electric storage device that combines high energy density of a battery and high output characteristics of an electric double layer. On the other hand, in the hybrid capacitor, a capacitor in which a negative electrode capable of storing and releasing lithium ions is brought into contact with metal lithium to let chemically or electrochemically store and carry (hereinafter, also referred to as dope) lithium ions in advance to lower a negative electrode potential, thereby the withstand voltage is heightened and the energy density is made considerably larger is proposed. (Patent documents 1 through 4)

In the hybrid capacitor, although high performance can be expected, when lithium ions are doped in a negative electrode, metal lithium has to be adhered to over an entire negative electrode. Furthermore, although it is possible as well to locally dispose metal lithium partially in a cell to bring into contact with a negative electrode, there are problems in that doping takes a very long time and uniform doping over an entire negative electrode is difficult. In particular, a large high capacity cell such as a cylindrical electric storage device where electrodes are wound or a rectangular electric storage device where a plurality of sheet electrodes is laminated is said difficult to put into practical use.

However, the problem came to a settlement at one stroke by an invention where, when holes that penetrate through both sides of a negative electrode current collector and a positive electrode current collector that constitute a cell are disposed and, through the holes, lithium ions are transported and simultaneously metal lithium that is a lithium ion supply source and a negative electrode are short-circuited, only by disposing metal lithium at an end portion of a cell, lithium ions can be doped over an entire negative electrode in a cell (patent document 5). Lithium ions are doped usually in a negative electrode. However, it is disclosed in patent document 5 that, similarly to the above, the lithium ions can be doped, together with in a negative electrode, in a positive electrode or, in place of in the negative electrode, in a positive electrode.

Thus, even in a large cell such as a cylindrical electric storage device where electrodes are wound or a rectangular electric storage device where a plurality of sheet electrodes is laminated, lithium ions can be doped in a short time to an entire negative electrode in the device and uniformly over an entire negative electrode, thereby the withstand voltage is improved to result in drastically increasing the energy density. As the result, a forecast that a capacitor having high capacitance together with large output density that an electric double layer capacitor intrinsically has is realized is obtained.

However, in order to put such a high capacitance capacitor into practical use, higher withstand voltage, higher capacitance, higher energy density and lower internal resistance are in demand.

Patent document 1: JP-A-08-107048
Patent document 2: JP-A-09-055342
Patent document 3: JP-A-09-232190
Patent document 4: JP-A-11-297578
Patent document 5: WO98/033227

DISCLOSURE OF THE INVENTION

The invention intends to provide, in a lithium ion capacitor where a positive electrode active material is a material capable of reversibly doping and dedoping lithium ions and/or anions, a negative electrode active material is a material capable of reversibly doping and dedoping lithium ions, and a negative electrode and/or a positive electrode is electrochemically brought into contact with a lithium ion supply source to dope in advance lithium ions in a negative electrode, a capacitor that has high energy density and high output density as well as high productivity of electrodes owing to an improvement in a current collector.

In order to overcome the problems, the inventors studied hard and found that, in a lithium ion capacitor where lithium ions are doped in advance to a negative electrode and/or a positive electrode so that potentials of a positive electrode and negative electrode after a positive electrode and a negative electrode are short-circuited are 2.0 V or less, the characteristics of the current collectors used in the positive electrode and/or negative electrode are deeply related with the energy density and the internal resistance of resulting capacitor and the productivity of electrodes, and when, as a current collector, preferably, a current collector constituted of a metal foil that is obtained by applying a specific treatment to a metal foil and has a lot of through-holes having a specified size is used, the problems can be overcome, and thereby the invention came to completion.

That is, as a current collector of an electrode in a lithium ion capacitor, a porous or nonporous sheet metal such as an expand metal, and a punching metal has been used. In the case of a porous metal, an average diameter of the through-holes is usually substantially 1 to 2 mm. However, according to the study of the inventors, it is found that, in a lithium ion capacitor where lithium ions are doped in advance to a negative electrode and/or a positive electrode so that potentials of positive electrode and negative electrode after the positive electrode and the negative electrode are short-circuited are 2.0 V or less, when an electrode has a current collector that has a lot of through-holes and an average diameter of inscribed circles of the through-holes of 100 µm or less, among these, a current collector obtained by etching treatment, laser treatment, preferably electrolytic etching treatment, the productivity of electrodes are improved and the energy density and the internal resistance of resulting capacitor are improved.

On the other hand, in a current collector of a lithium ion capacitor, so far, when a slurry-like material containing an electrode active material is carried by coating or dipping on a current collector, since a diameter of the through-hole is large, a die coater is necessitated, and, in some cases, under coating is necessitated. Furthermore, usually, the slurry is coated while pulling up in a vertical direction; accordingly, from the problem of the mechanical strength, the productivity is poor. However, it is found that, in the case of a current collector such as mentioned above, which has through-holes small in the diameter, by a comma coater or the like, the slurry-like material containing an electrode active material can be readily applied on a current collector; that is, since undercoating or coating in a vertical direction are not necessarily required, the productivity of electrodes is not problematic.

(1) According to one or more examples of the invention, a lithium ion capacitor includes:

a positive electrode made of a material capable of reversibly doping and dedoping lithium ions and/or anions;

a negative electrode made of a material capable of reversibly doping and dedoping lithium ions; and as an electrolytic solution, an aprotonic organic solvent electrolyte solution of a lithium salt. In the lithium ion capacitor, lithium ions are doped in a negative electrode and/or a positive electrode due to an electrochemical contact between the negative electrode and/or positive electrode and a lithium ion supply source. A positive electrode potential after the positive electrode and the negative electrode are short-circuited is 2.0 V or less. The positive electrode and/or the negative electrode has a current collector made of a metal foil that has a number of holes that penetrate through both sides and have an average diameter of inscribed circles of the through-holes of 100 µm or less.

(2) In the lithium ion capacitor of (1), a negative electrode active material has electrostatic capacitance per unit weight larger by three times or more than that of the positive electrode active material, and a weight of the positive electrode active material is larger than that of the negative electrode active material.

(3) In the lithium ion capacitor of (1) or (2), a current collector is an aluminum foil and/or a copper foil that is rendered porous by electrolytic etching.

(4) In the lithium ion capacitor of (1) or (2), a current collector is an aluminum foil and/or a copper foil that is rendered porous by a laser.

(5) In the lithium ion capacitor of any one of (1) to (4), a positive electrode active material is activated carbon, conductive polymer or polyacene-based organic semiconductor that is a heat-treated material of an aromatic condensation polymer and has a polyacene skeleton structure where a ratio of number of hydrogen atoms/number of carbon atoms is in the range of 0.50 to 0.05.

(6) In the lithium ion capacitor of any one of (1) to (5), a negative electrode active material is graphite, carbon difficult to graphitize or a polyacene-based organic semiconductor that is a heat-treated material of an aromatic condensation polymer and has a polyacene-based skeleton structure where a ratio of number of hydrogen atoms/number of carbon atoms is in the range of 0.50 to 0.05.

According to the invention, a capacitor that is a lithium ion capacitor in which in advance lithium ions are doped in a negative electrode and/or a positive electrode and that has the characteristics excellent in particular in the energy density and the internal resistance is provided.

In addition, when a positive electrode and/or a negative electrode in a lithium ion capacitor in the invention is produced, by a comma coater or the like, a slurry-like material containing an electrode active material can be readily applied on a current collector, and undercoating and coating in a vertical direction are not necessarily required; accordingly, the productivity of electrodes as well is high.

In the invention, when, as a current collector of a positive electrode and/or a negative electrode, a current collector that is constituted of a metal foil that is obtained by applying preferably laser treatment or etching treatment, in particular, the electrolytic etching on the metal foil and has throughholes having a specified dimension is used, based on the mechanism below, a lithium ion capacitor having the characteristics excellent in the energy density and the internal resistance can be obtained.

An electrode active material is generally low in the conductivity; accordingly, a highly conductive and porous metal sheet or metal foil is used as a current collector and an electrode active material is thinly coated thereonto reduce the resistance. However, in the case of a metal sheet (foil) having through-holes, an electrode layer of a portion of a penetrating hole does not have a current collecting effect due to metal; accordingly, it is considered that, in comparison with a case where a size of the through-hole is small, the internal resistance is higher. However, according to the study of the inventors, in the case where a porous metal foil is used as a current collector, as far as an average diameter of the inscribed circles of the through-holes is 100 µm or less, the internal resistance does not become smaller even when a size thereof becomes smaller than that. In addition, like in the invention, in a lithium ion capacitor where lithium ions are doped in advance to a negative electrode and/or a positive electrode, when lithium ions are doped, the current collector indispensably has the through-holes and, for that purpose, the through-holes as large as possible in the size are required. However, the size of the through-hole, as far as it is within the foregoing range, even when the size is not larger than that, does not affect adversely.

Furthermore, positive electrode and negative electrode slurries that are coated on a porous current collector are obtained by dispersing an electrode active material having an average particle diameter substantially in the range of 1 to 10 μm in an organic solvent or water. The viscosity thereof is substantially in the range of 100 to 10000 cps and, in particular when a die is used to coat, the slurry is used at the viscosity such low as 200 to 500 cps. Accordingly, when an expand metal having the through-holes of which size is 1 mm or more is used like before, the slurry leaks. However, when a size of the through-holes is in the above range like a current collector in the lithium ion capacitor of the invention, at the time of coating the electrode slurry, the slurry does not leak; accordingly, simple means such as a comma coater or the like can be readily used to coat.

Other characteristics and advantages are obvious from descriptions of examples and attached claims.

BRIEF DESCRIPTION OF THE DRAWINGS

FIG. 1 is a schematic diagram showing a structure of a capacitor cell used in example 1.

DESCRIPTION OF REFERENCE NUMERALS

1: Positive electrode
1': Current collector (positive electrode)
2: Negative electrode
2': Current collector (negative electrode)
3: Separator
4: Lithium metal (lithium ion supply source)
4': Current collector (lithium metal)
5: Conducting wire

BEST MODE FOR CARRYING OUT THE INVENTION

A lithium ion capacitor according to a typical example of the invention include a positive electrode, a negative electrode and, as an electrolytic solution, an aprotonic organic electrolytic solution of a lithium salt. A positive electrode active material is a material capable of reversibly doping and dedoping lithium ions and/or anions. A negative electrode active material is a material capable of reversibly doping and dedoping lithium ions. Here, "dope" means carrying, absorbing, adsorbing or inserting as well, and, in a broad meaning, a phenomenon where lithium ions and/or anions enter into an active material. Furthermore, "dedope" means desorbing and detaching as well, and, in a broad meaning, a phenomenon where lithium ions and/anions are released from an active material. A "positive electrode" is an electrode on a side therefrom a current comes out at the time of discharge and a "negative electrode" is an electrode on a side thereto a current flows at the time of discharge.

In a lithium ion capacitor according to a typical example of the invention, a positive electrode potential after a positive electrode and a negative electrode are short-circuited by doping lithium ions to the negative electrode and/or positive electrode is necessarily set at 2.0V (vs. Li/Li$^+$) or less. In a capacitor where lithium ions are not doped to a negative electrode and/or a positive electrode, both of positive electrode potential and negative electrode potential are substantially 3 V (vs. Li/Li$^+$) and a positive electrode potential after the positive electrode and negative electrode are short-circuited is substantially 3 V (vs. Li/Li$^+$). In the invention, a positive electrode potential after the positive electrode and negative electrode are short-circuited being 2.0 V (vs. Li/Li$^+$) or less means that either (A) a positive electrode potential obtained when, after lithium ions are doped, a positive electrode terminal and a negative electrode terminal of a capacitor are bonded directly by a conducting wire, a capacitor is left in this state for 12 hr or more, followed by releasing the short circuit, further followed by measuring within a time in the range of 0.5 to 1.5 hr or (B) a positive electrode potential obtained when the constant current discharge is carried out to 0 V over 12 hr or more on a charge and discharge tester, followed by, with a positive electrode terminal and a negative electrode terminal bonded by a conducting wire, leaving a capacitor for 12 hr or more, further followed by releasing the short circuit, still further followed by measuring within a time in the range of 0.5 to 1.5 hr is 2.0 V (vs. Li/Li$^+$) or less.

Furthermore, "a positive electrode potential after the short circuiting being 2.0V (vs. Li/Li$^+$) or less" means, without restricting to immediately after lithium ions are doped, a case where a positive electrode potential becomes 2.0 V (vs. Li/Li$^+$) or less after the short circuiting in any one of states of short circuiting after repeating charging state, discharging state or charging and discharging.

As to the positive electrode potential becoming 2.0 V (vs. Li/Li$^+$) or less, detailed description will be given below. As mentioned above, active carbon and a carbon material usually have a potential around substantially 3 V (vs. Li/Li$^+$) Accordingly, when a cell is assembled with active carbon in both of a positive electrode and a negative electrode, since both potentials become substantially 3 V (vs. Li/Li$^+$), a cell voltage becomes substantially 0 V, and, after the short circuiting, a positive electrode potential remains, without showing any change, at substantially 3 V (vs. Li/Li$^+$) Furthermore, also in a case of a hybrid capacitor where active carbon is used in a positive electrode and a carbon material such as graphite or carbon difficult to graphitize that is used in a lithium ion secondary battery is used in a negative electrode, similarly to the above, since both potentials become substantially 3 V (vs. Li/Li$^+$), a cell voltage becomes substantially 0 V, and, after the short circuiting, a positive electrode potential remains, without showing any change, at substantially 3 V (vs. Li/Li$^+$). Although depending on a weight balance between a positive electrode and a negative electrode, upon charging, a negative electrode potential shifts to the proximity of 0 V; accordingly, a charging voltage can be heightened and thereby a capacitor having a high voltage and a high energy density is obtained. In general, the upper limit of the charging voltage is determined to a voltage where an electrolytic solution is not decomposed due to a rise in the positive electrode potential; accordingly, when the positive electrode potential is set to the upper limit, by a portion where the negative electrode potential comes down, the charging voltage can be heightened. However, in the above-mentioned hybrid capacitor where a positive electrode potential at the short-circuiting is substantially 3.0 V (vs. Li/Li$^+$), when the upper limit potential of the positive electrode is set at, for instance, 4.0 V (vs. Li/Li$^+$), the positive electrode potential at the discharge is down to 3.0 V (vs. Li/Li$^+$), that is, the potential variation of the positive electrode is substantially 1.0V (vs. Li/Li$^+$); accordingly, the capacitance of the positive electrode is not fully utilized. Furthermore, it is known that, when lithium ions are inserted (charged) in or detached (discharge) from a negative electrode, an initial charge and discharge efficiency is low in many cases and lithium ions that can not be detached at the discharge are present. This is explained in that lithium ions are consumed in decomposition of an electrolytic solution on a negative electrode surface or trapped in structural defects of the carbon material. However, in this case, in comparison with the charging and discharging efficiency of the positive electrode, the charging and discharging efficiency of the negative electrode becomes lower, and, when, after repetition of the charge and discharge, a cell is short-circuited, the positive electrode potential becomes higher than 3 V (vs. Li/Li$^+$), thereby, the available capacitance is further lowered. That is, when, while the positive electrode is dischargeable from 4.0 V (vs. Li/Li$^+$) to 2.0 V (vs. Li/Li$^+$), only a portion from 4.0V (vs. Li/Li$^+$) to 3.0V (vs. Li/Li$^+$) is used, only a half the available capacitance is used, that is, although a high voltage is obtained, high capacitance is not obtained.

In order to make a hybrid capacitor high not only in the voltage and energy density but also in the capacitance and energy density, the available capacitance of a positive electrode has to be improved.

When the positive electrode potential after the short circuiting becomes lower than 3.0V (vs. Li/Li$^+$), by that amount, the available capacitance increases to be high in the capacitance. In order to make 2.0 V (vs. Li/Li$^+$) or less, in addition to an amount charged owing to the charge and discharge of a cell, the lithium ions are preferably charged to a negative electrode separately from metal lithium. Since the lithium ions are fed from other than the positive electrode and negative electrode, upon short-circuiting, an equilibrium potential of the positive electrode, negative electrode and metal lithium is established; accordingly, both the positive electrode potential and negative electrode potential become 3.0V (vs. Li/Li$^+$) or less. With an increase in an amount of lithium metal, the equilibrium potential becomes lower. Since, depending on the negative electrode active material and positive electrode active material, an equilibrium potential as well varies, while considering the characteristics of the negative electrode active material and positive electrode active material, lithium ions that are doped in the negative electrode have to be controlled so that the positive electrode potential after the short circuiting becomes 2.0 V (vs. Li/Li$^+$) or less.

In a typical example of the invention, when lithium ions are doped in advance to a negative electrode and/or a positive electrode and a positive electrode potential after the positive electrode and negative electrode are short-circuited is set at 2.0 V (vs. Li/Li$^+$) or less, the available capacitance of the positive electrode becomes high to result in high capacitance, thereby large energy density is obtained. The more the supply amount of lithium ions is increased, the lower the positive electrode potential when the positive electrode and the negative electrode are short-circuited becomes to be higher in the energy density. In order to obtain higher energy density, 1.5 V (vs. Li/Li$^+$) or less is preferred and 1.0 V (vs. Li/Li$^+$) or less is particularly preferred. When an amount of lithium ions supplied to the positive electrode or negative electrode is scarce, the positive electrode potential when the positive electrode and negative electrode are short-circuited becomes higher than 2.0 V (vs. Li/Li$^+$) to result in smaller energy density of a cell.

However, when the positive electrode potential becomes less than 1.0V (vs. Li/Li$^+$), though depending on the positive electrode active material, in some cases, inconveniences such as gas generation, irreversible consumption of lithium ions or the like is caused to result in difficulty in measuring the positive electrode potential.

Furthermore, a case when the positive electrode potential is too low means that an electrode weight of the negative electrode is excessive, and, in some cases, the energy density becomes lower to the contrary.

In general, the positive electrode potential is preferably 0.1 V (vs. Li/Li$^+$) or more and more preferably 0.3 V (vs. Li/Li$^+$) or more.

In a typical example of the invention, lithium ions can be doped to one or both of a negative electrode and a positive electrode. However, in the case of, for instance, active carbon being used in a positive electrode, when an amount of doped lithium ions become much and thereby the positive electrode potential becomes low, lithium ions are irreversibly consumed to result in, in some cases, inconveniences such as a decrease in cell capacitance. Accordingly, lithium ions that are doped to the negative electrode and positive electrode are preferably set so as to avoid such inconveniences by considering the respective electrode active materials. In a typical example of the invention, it is troublesome to control a doping amount of a positive electrode and a doping amount of a negative electrode from the viewpoint of the process; accordingly, lithium ions are doped preferably to the negative electrode.

In a lithium ion capacitor of a typical example of the invention, in particular, when electrostatic capacitance per unit weight of a negative electrode active material is three times or more electrostatic capacitance per unit weight of a positive electrode active material and a weight of the positive electrode active material is set larger than a weight of a negative electrode active material, a capacitor having high voltage and high capacitance is obtained. Furthermore, simultaneously therewith, when a negative electrode having electrostatic capacitance per unit weight larger than electrostatic capacitance per unit weight of a positive electrode is used, without changing an amount of potential variation of the negative electrode, a weight of the negative electrode active material can be reduced; accordingly, a charge amount of the positive electrode active material becomes much to result in larger electrostatic capacitance and capacitance of a cell.

In the invention, electrostatic capacitance and capacitance of a capacitor cell (hereinafter, in some cases, simply referred to as cell) are defined as follows. The electrostatic capacitance of a cell shows an amount of electricity (gradient of a discharge curve) flowing to a cell per unit voltage of a cell and a unit thereof is F (farad). The electrostatic capacitance per unit weight of a cell is shown by a rate of the electrostatic capacitance of a cell to a total weight of the positive electrode active material and negative electrode active material filled in the cell and a unit thereof is F/g. Furthermore, the electrostatic capacitance of the positive electrode or negative electrode shows an amount of electricity (gradient of a discharge curve) flowing to a cell per unit voltage of the positive electrode or negative electrode and a unit thereof is F (farad). The electrostatic capacitance per unit weight of the positive electrode or negative electrode is a rate of the electrostatic capacitance of the positive electrode or negative electrode to an amount of the positive electrode or negative electrode active material filled in a cell and a unit thereof is F/g.

Furthermore, cell capacitance is a product of a difference between a discharge start voltage and a discharge end voltage of a cell, that is, a voltage variation and the electrostatic capacitance of a cell and a unit thereof is C (coulomb). However, since 1 C is an amount of electricity when a current of 1 A flows for 1 sec, in the invention, by converting, a mAh expression is used. The positive electrode capacitance is a product of a difference of a positive electrode potential at the start of the discharge and a positive electrode potential at the end of the discharge (positive electrode potential variation)

and the electrostatic capacitance of the positive electrode and a unit thereof is C or mAh. Similarly, the negative electrode capacitance is a product of a difference of a negative electrode potential at the start of the discharge and a negative electrode potential at the end of the discharge (negative electrode potential variation) and the electrostatic capacitance of the negative electrode and a unit thereof is C or mAh. The cell capacitance and the positive electrode capacitance and the negative electrode capacitance coincide.

In a lithium ion capacitor of the invention, means for doping lithium ions in advance to a negative electrode and/or a positive electrode are not particularly restricted. For instance, a lithium ion supply source capable of supplying lithium ions such as metal lithium can be disposed as a lithium electrode in a capacitor cell. An amount of the lithium ion supply source (weight of lithium metal or the like) can be an amount capable of obtaining predetermined capacitance of the negative electrode. In this case, a negative electrode and a lithium electrode can be brought into physical contact (short circuiting) to dope or electrochemical doping can be adopted. A supply source of lithium ions can be formed on a lithium electrode current collector made of a conductive porous body. As a conductive porous body that becomes a lithium electrode current collector, a metal porous body such as a stainless mesh that does not react with the lithium ion supply source can be used.

In a large capacity multi-layered lithium ion capacitor of the invention such as mentioned above, the positive electrode and negative electrode, respectively, are provided with a porous positive electrode current collector and a porous negative electrode current collector, which receive and distribute electricity. However, when such positive electrode current collector and negative electrode current collector are used and a lithium electrode is disposed, it is preferred that the lithium electrode is disposed at a position that faces the negative electrode current collector to electrochemically supply lithium ions to a negative electrode. In the lithium ion capacitor of the invention, even when a lithium electrode that dopes lithium ions to a negative electrode and/or a positive electrode is disposed locally in a cell, lithium ions can be uniformly doped. Accordingly, also in the case of a large capacity cell where a positive electrode and a negative electrode are laminated or wound, when a lithium electrode is partially disposed at the outermost circumference or on the outermost side, lithium ions can be smoothly and uniformly doped to the negative electrode. A lithium supply source disposed in a cell means a material that contains at least a lithium element such as metal lithium or a lithium-aluminum alloy and can supply lithium ions.

As a current collector in the above-mentioned positive electrode and/or negative electrode, a current collector made of a metal foil having many holes that penetrate through both sides and have a size that does not allow a ball having a diameter of 100 μm to goes through is used. As a metal foil, various materials that are proposed generally for a current collector of a lithium-based battery can be used. For instance, in a positive electrode current collector, aluminum, stainless steel or the like is preferred. In a negative electrode current collector, stainless steel, copper, nickel or the like is preferred.

In a typical example of the invention, a thickness of a metal foil that constitutes a current collector is preferably in the range of 5 to 100 μm and particularly preferably in the range of 15 to 50 μm. Such a metal foil has many holes penetrating through both sides and an average diameter of inscribed circles of the through-holes is necessarily 100 μm or less. The size of the through-hole is important. When an average diameter of inscribed circle is such large as exceeding 100 μm, since the current collecting effect of an electrode layer can not be obtained, the resistance becomes high and since, at the coating, a slurry leaks from a coated surface to a back surface, simple coating becomes difficult. Above all, an average diameter of the inscribed circles of the through-holes is preferably 50 μm or less and particularly preferably 10 μm or less. The lower limit of the size of the through-hole is not particularly restricted. However, in order that lithium ions that are doped in advance and an electrolytic solution can be dispersed smoothly, an average diameter of the inscribed circles is preferably 0.5 μm or more. In the invention, an average diameter of the inscribed circles of the through-holes is obtained by observing a surface of a current collector by a laser microscope or a tool maker's microscope, followed by fitting an inscribed circle to the through-hole.

A shape of the through-hole in a typical example of the invention can have an arbitrary shape, in a cross section, such as a circle, an ellipse, a rectangle, a rhombus, and a slit. Among these, a circle, an ellipse and a rectangle are preferred. The through-holes do not necessarily have same sizes and same shapes along a thickness direction of a metal foil and can have different sizes and shapes.

Furthermore, although a metal foil has many through-holes, preferably, the metal foil uniformly has through-holes having a regular geometrical pattern. In the metal foil, the aperture ratio is preferably in the range of 10 to 79% and particularly preferably in the range of 20 to 60%. The aperture ratio in the invention is defined as one obtained by converting a ratio of {(1−(weight of current collector/specific gravity of current collector)/(apparent volume of current collector)} in percentage.

Means for producing a current collector made of a metal foil having the through-holes are not particularly restricted. In a typical example of the invention, an etching treatment, in particular, an electrolytic etching treatment, a laser treatment and the like can be cited as preferable ones. As the etching treatment, in particular, as the electrolytic etching treatment, existing methods can be used and, as an etching medium, an acid such as hydrochloric acid can be used. Furthermore, as conditions at the electrolytic etching, since an etching shape varies depending on a current waveform, a composition of a solution and a temperature, these conditions are necessarily appropriately optimized so as to be able to obtain a desired shape. Still furthermore, in the laser treatment, a $CO_2$ laser having a frequency of 9.3 μm is preferably used. However, other than that, a YAG laser, a UV laser and the like is used.

In a typical example of the invention, a positive electrode active material carried by the current collector is made of a material capable of reversibly doping and dedoping lithium ions and anions such as tetrafluoroborate. As such positive electrode active material, various kinds of materials can be used. However, activated carbon or a polyacene organic semiconductor (PAS) that is a heat-treated material of an aromatic condensation polymer and has a polyacene skeleton structure where a ratio of numbers of hydrogen atoms/carbon atoms is in the range of 0.50 to 0.05 is preferred.

A particle diameter of the positive electrode active material is, for instance, by 50% volume cumulative diameter (also referred to as D50), 2 μm or more, preferably in the range of 2 to 50 μm and particularly preferably in the range of 2 to 20 μm. Furthermore, an average pore diameter is preferably 10 μm or less, and the specific surface area is preferably in the range of 600 to 3000 $m^2/g$ and particularly preferably in the range of 1300 to 2500 $m^2/g$.

In a typical example of the invention, when a positive electrode active material powder is carried by a current collector, it is preferred that a binder and a conductive powder that is used as needs arise are dispersed in an aqueous or organic solvent to prepare a slurry and the slurry is coated on a current collector. As a binder used here, a rubber-based binder such as SBR, NBR or the like, a fluorine-containing resin such as polytetrafluoroethylene, polyvinylidene fluoride or the like, or a thermoplastic resin such as polypropylene, polyethylene, polyacrylate or the like can be used. A usage amount of the binder is, though different depending on the electroconductivity of the negative electrode active material, a shape of the electrode and so on, appropriately in the range of 2 to 40 parts by weight to 100 parts by weight of the negative electrode active material. As the conductive material, acetylene black, graphite, metal powder or the like can be cited. The conductive material is, though different depending on the electroconductivity of the positive electrode active material, a shape of the electrode and so on, preferably added in the range of 2 to 40 parts by weight and more preferably in the range of 5 to 10 parts by weight to 100 parts by weight of the positive electrode active material.

A slurry made of a positive electrode active material, a binder and a conductive material that is added as needs arise is coated on a current collector made of the metal foil. In a typical example of the invention, as mentioned above, at this time, an opening of a through-hole that the metal foil has is small; accordingly, convenient means such as a comma coater, a roll coater, and a doctor blade can be used to readily coat. Without necessitating undercoat, by a single coating, a coated film having a uniform thickness is obtained; however, as needs arise, multiple coating can be applied to further improve the physical property of a coated film. Furthermore, when the slurry is coated on a metal foil, it is not necessary to coat while pulling up the metal foil in a vertical direction as before; that is, the slurry can be coated even in a level direction or the like. Thus, preferably, on both sides of the metal foil, the slurry is coated, followed by drying and pressing, thereby a positive electrode having a positive electrode layer having a thickness preferably in the range of 50 to 500 μm and particularly preferably in the range of 100 to 300 μm is produced.

On the other hand, a negative electrode active material constituting a negative electrode of the invention is formed of a material capable of reversibly doping and dedoping lithium ions. As a preferable negative electrode active material, carbon materials such as graphite, carbon difficult to graphitize, hard carbon, and cokes, the polyacene substance (PAS) described also as the positive electrode active material and the like can be cited. As the carbon materials and PAS, ones obtained by carbonizing a phenol resin or the like, followed by activating as needs arise, further followed by pulverizing are used.

The PAS that is used as a negative electrode active material has an amorphous structure; accordingly, when lithium ions are doped and dedoped, there is no structural variation such as swelling and contraction; as the result, the cycle characteristics are excellent. Furthermore, the PAS has a molecular structure (higher-order structure) isotropic to doping and dedoping of lithium ions; accordingly, the PAS is preferably excellent as well in the rapid charging and rapid discharging. An aromatic condensation polymer that is a precursor of the PAS is a condensate of an aromatic hydrocarbon compound and aldehydes. As the aromatic hydrocarbon compound, so-called phenols such as phenol, cresol, and xylenol can be preferably used. For instance, methylene bisphenols expressed by a formula below

[Chemical Formula 1]

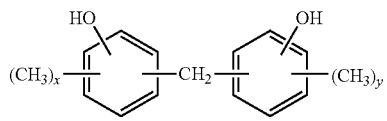

(here, x and y are, respectively and independently, 0, 1 or 2), hydroxybiphenyls and hydroxy naphthalenes can be used. Among these, phenols are preferred.

Furthermore, as the aromatic condensation polymer, a modified aromatic condensation polymer obtained by partially substituting the aromatic hydrocarbon compound having a phenolic hydroxyl group with an aromatic hydrocarbon compound such as xylene, toluene, aniline that does not have a phenolic hydroxyl group can be used as well. An example of the modified aromatic condensation polymer is a condensation polymer of phenol, xylene and formaldehyde. Still furthermore, a modified aromatic polymer substituted with melamine and urea can be used and a furan resin as well is preferred.

In a typical example of the invention, the PAS is produced as shown below. That is, when the aromatic condensation polymer is gradually heated to an appropriate temperature in the range of 400 to 800° C. in a non-oxidizing atmosphere (including a vacuum atmosphere), an insoluble and infusible base having a ratio of number of hydrogen atoms/number of carbon atoms (hereinafter, referred to as H/C) in the range of 0.5 to 0.05 and preferably in the range of 0.35 to 0.10 is obtained. When the insoluble and infusible base is gradually heated in a non-oxidizing atmosphere (including a vacuum atmosphere) to a temperature in the range of 350 to 800° C. and preferably in the range of 400 to 750° C., an insoluble and infusible base body having the H/C and, when activated, the specific surface area measured by the BET method of 600 $m^2/g$ or more is obtained as well.

The insoluble and infusible base has, according to X-ray diffraction (Cu Kα), by 2θ, a main peak at 24° or less and, other than the main peak, another broad peak in the range of to 46°. That is, the insoluble and infusible base body has a polyacene-based skeleton structure that has an appropriately developed aromatic polycyclic structure and an amorphous structure and in which lithium ions can be stably doped.

In a typical example of the invention, a particle diameter of the negative electrode active material is, by D50, in the range of 0.5 to 30 μm, preferably in the range of 0.5 to 15 μm and particularly preferably in the range of 0.5 to 6 μm. Furthermore, particles of a negative electrode active material of a typical example of the invention have a specific surface area preferably in the range of 0.1 to 2000 $m^2/g$, more preferably in the range of 0.1 to 1000 $m^2/g$ and particularly preferably in the range of 0.1 to 600 $m^2/g$.

As means for producing a negative electrode by use of the negative electrode active material and a current collector made of the metal foil, means similar to that in the positive electrode can be used. That is, a negative electrode active material powder, a binder and a conductive powder that is used as needs arise are dispersed in water or an organic solvent to prepare a slurry and the slurry is coated on a current collector to prepare a negative electrode. As a binder and conductive powder that are used, similar ones can be used and usage amounts thereof as well are same as that in the case of the positive electrode. In a lithium ion capacitor of a typical example of the invention, both a positive electrode and a negative electrode are preferably formed by use of a current collector made of the specified metal foil. However, as needs arise, the current collector can be used only in any one of a positive electrode and a negative electrode.

Furthermore, as an aprotonic organic solvent that forms an aprotonic organic solvent electrolyte solution in a lithium ion capacitor of a typical example of the invention, for instance, ethylene carbonate, propylene carbonate, dimethyl carbonate, diethyl carbonate, γ-butylolactone, acetonitrile, dimethoxyethane, tetrahydrofuran, dioxolan, methylene chloride, sulfolane and so on can be cited. Furthermore, a mixed solution obtained by mixing at least two kinds of the aprotonic organic solvents can be used as well.

As an electrolyte that is dissolved in the single or mixed solvent, as far as it is an electrolyte that can generate lithium ions, all kinds of electrolytes can be used. Examples of such electrolytes include $LiClO_4$, $LiAsF_6$, $LiBF_4$, $LiPF_6$, $LiN(C_2F_5SO_2)_2$ and $LiN(CF_3SO_2)_2$. The electrolyte and solvent are mixed in a thoroughly dewatered state to form an electrolyte solution. A concentration of the electrolyte in an electrolytic solution is, in order to make the internal resistance due to the electrolytic solution small, set preferably at least at 0.1 mol/l or more and more preferably in the range of 0.5 to 1.5 mol/l.

Furthermore, a lithium ion capacitor of a typical example of the invention is particularly appropriate for a large capacity cell such as a winding cell where a band positive electrode and a band negative electrode are wound with a separator interposed therebetween, a laminate cell where the respective three or more layers of planar positive electrode and planar negative electrode are laminated with a separator interposed therebetween, or a film cell where a laminate where the respective three layers of planar positive electrode and planar negative electrode are laminated with a separator interposed therebetween is encapsulated in an outer film. The cell structures have been known from WO00/07255, WO03/003395 and JP-A No. 2004-266091 and a capacitor cell of the invention as well can adopt a structure same as that of existing cells.

In what follows, the invention will be specifically described with reference to examples. However, it goes without saying that the invention is not restricted to the examples.

Example 1

Producing Method of Negative Electrode 1

A 0.5 mm thick phenol resin molded plate is put in a siliconit electric furnace, heated in a nitrogen atmosphere to 500° C. at a temperature-up speed of 50° C./hr, followed by further heating to 660° C. at a temperature-up speed of 10° C./hr, further followed by heat-treating, thereby a PAS is synthesized. Thus obtained PAS plate is pulverized by a disc mill to obtain a PAS powder. The H/C ratio of the PAS powder is 0.21. In the next place, 100 parts by weight of the PAS powder and a solution where 10 parts by weight of polyvinylidene fluoride powder is dissolved in 80 parts by weight of N-methylpyrrolidone are thoroughly mixed to obtain a slurry. The slurry is coated by use of a doctor blade on one surface of a copper foil having a thickness of 18 μm at substantially 7 mg/cm² as a solid content, dried and pressed, and, thereby a PAS negative electrode 1 is obtained.

(Producing Method of Positive Electrode 1)

Then, 100 parts by weight of commercially available activated carbon having the specific surface area of 1950 m²/g and a solution where 10 parts by weight of polyvinylidene fluoride powder is dissolved in 100 parts by weight of N-methyl pyrrolidone are thoroughly mixed to obtain a slurry. The slurry is coated by use of a doctor blade on one surface of an aluminum foil having a thickness of 20 μm, on which a carbon-based conductive paint is coated, at substantially 7 mg/cm² as a solid content, dried and pressed, and, thereby a positive electrode 1 is obtained.

(Measurement of Electrostatic Capacitance Per Unit Weight of Positive Electrode 1)

The positive electrode is cut into a size of 1.5×2.0 cm² as an evaluation positive electrode. The positive electrode and, as a counter electrode, metal lithium having a size of 1.5×2.0 cm² and a thickness of 200 μm are assembled through a polyethylene nonwoven fabric having a thickness of 50 μm as a separator and thereby a simulated cell is prepared. As a reference electrode, metal lithium is used. As an electrolytic solution, a solution obtained by dissolving $LiPF_6$ at a concentration of 1 mole/l in propylene carbonate is used.

At a charge current of 1 mA, charging is carried out to 3.6 V, followed by charging at a constant voltage, after a total charging time of 1 hr, further followed by discharging at 1 mA to 2.5 V. The electrostatic capacitance per unit weight of the positive electrode 1 is obtained from a discharging time between 3.5 V to 2.5 V and found to be 92 F/g.

(Measurement of Electrostatic Capacitance Per Unit Weight of Negative Electrode 1)

Four sheets of the negative electrode having a size of 1.5×2.0 cm² are cut out as an evaluation negative electrode. The negative electrode and, as a counter electrode, metal lithium having a size of 1.5×2.0 cm² and a thickness of 200 μm are assembled through a polyethylene nonwoven fabric having a thickness of 50 μm as a separator and thereby a simulated cell is prepared. As a reference electrode, metal lithium is used. As an electrolytic solution, a solution obtained by dissolving $LiPF_6$ at a concentration of 1 mole/l in propylene carbonate is used.

At a charging current of 1 mA, lithium ions corresponding to 280 mAh/g, 350 mAh/g, 400 mAh/g or 500 mAh/g are charged to the respectively, in accordance with active material weights of each negative electrode, followed by discharging to 1.5 V at 1 mA. From a discharge time during which a negative electrode potential at 1 min after the discharge start shows a variation of 0.2 V, the electrostatic capacitance per unit weight of the negative electrode 1 is obtained. Results are shown in Table 1.

TABLE 1

| Charge Amount (mAh/g) | 280 | 350 | 400 | 500 |
|---|---|---|---|---|
| Electrostatic Capacitance per Unit Weight of Negative Electrode 1 (F/g) | 308 | 468 | 661 | 758 |

The charge amount here is a value obtained by dividing an integrated value of a charge current flowed to the negative electrode by a weight of negative electrode active material and a unit thereof is mAh/g.

(Producing Method of Negative Electrode 2)

On both surfaces of copper expand metal that is 1.3:0.65:0.136 in the LW:SW:W, 26 μm in the thickness, 54% in the aperture ratio and 0.73 mm in the average diameter of inscribed circles of through-holes (produced by Nihon Kinzoku Kogyo K. K.), the slurry of a negative electrode 1 is vertically coated by a die coater at the speed of 1 m/mm, followed by molding and pressing, thereby a negative electrode 2 of which total thickness after the pressing (a sum total of thicknesses of the negative electrode layers on both sides and a thickness of the expand metal) is 152 μm is obtained.

(Producing Method of Positive Electrode 2)

On one surface of an electrolytic etched aluminum foil that is 50 μm in the thickness, 30% in the aperture ratio and 2 μm in an average diameter of inscribed circles of through-holes, the slurry of a positive electrode 1 is horizontally coated by a roll coater at the speed of 5 m/min, followed, after drying, by further horizontally coating on the other surface by a roll coater at the speed of 5 m/min. After drying and pressing, a positive electrode 2 of which total thickness (a sum total of thicknesses of the positive electrode layers on both sides and a thickness of the aluminum foil) is 310 μm is obtained.

(Preparation of Electrode Lamination Unit)

The negative electrode 2 having a thickness of 152 μm and the positive electrode 2 having a thickness of 310 μm are cut into 6.0×7.5 cm² (excluding a terminal welding portion), and, with a 35 μm-thick cellulose/rayon mixed nonwoven fabric as a separator and with a positive electrode current collector and a negative electrode current collector disposed so that the terminal welding portions thereof are opposite to each other, the positive electrodes and negative electrodes are laminated so that facing surfaces thereof are 20 layers and so that the outermost electrode of the laminated electrodes is a negative electrode. With a separator disposed on each of the uppermost portion and the lowermost portion, four sides are fastened with a tape, and terminal welding portions of the positive electrode current collectors (10 sheets) and terminal welding portions of the negative electrode current collectors (11 sheets), respectively, are ultrasonic welded to aluminum positive electrode terminals and copper negative electrode terminals having a width of 50 mm, a length of 50 mm and a thickness of 0.2 mm, and thereby an electrode lamination unit is obtained. Here, 10 sheets of the positive electrodes and 11 sheets of the negative electrodes are used. A weight of the positive electrode active material is 1.4 times a weight of the negative electrode active material.

(Preparation of Cell 1)

As a lithium electrode, one obtained by pressure bonding a metal lithium foil (82 μm, 6.0×7.5 cm², 200 mAh/g equivalent) to a stainless mesh having a thickness of 80 μm is used. One lithium foil is disposed on each of an upper portion and a lower portion of the electrode lamination unit_so as to completely face the negative electrode at the outermost portion, thereby, a three electrode lamination unit is obtained. Terminal welding portions of the lithium electrode current collector (2 sheets) are resistance welded to the negative electrode terminal welding portion.

The three electrode lamination unit is disposed inside of an outer film deep-drawn by 6.5 mm, covered with an outer lamination film and fused at three sides, followed by vacuum impregnating, as an electrolytic solution, a solution obtained by dissolving $LiPF_6$ at a concentration of 1 mol/l in a mixed solvent obtained by mixing ethylene carbonate, diethyl carbonate and propylene carbonate at a weight ratio of 3:4:1, further followed by fusing remaining one side, thus, 4 cells of film type lithium ion capacitors are assembled. Here, metal lithium disposed in a cell corresponds to 400 mAh/g per a unit weight of a negative electrode active material.

(Initial Evaluation of Cell)

After the cells are left for 20 days after the cells are assembled, when one cell is decomposed, it is found that metal lithium is completely consumed. From this, it is judged that lithium ions for obtaining electrostatic capacitance of 660 F/g or more per unit weight of the negative electrode active material are doped in advance. The electrostatic capacitance of the negative electrode amounts to 7.2 times the electrostatic capacitance of the positive electrode.

(Characteristics Evaluation of Cell)

A cell is charged at a constant current of 2000 mA until a cell voltage becomes 3.6 V, followed by applying for 1 hr constant current-constant voltage charge where a constant voltage of 3.6 V is applied. In the next place, discharge is carried out at a constant current of 200 mA until a cell voltage becomes 1.9 V. The 3.6 V-1.9 V cycle is repeated and, at the tenth discharge, cell capacitance and energy density are evaluated. Results are shown in Table 2. The data are average values of three cells.

TABLE 2

| | Capacitance (mAh) | Energy Density (Wh/l) | Internal Resistance (mΩ) |
|---|---|---|---|
| Example 1 | 195 | 12.2 | 8.5 |

After the measurement came to completion, the positive electrode and negative electrode are short-circuited and a positive electrode potential is measured. The positive electrode potential is substantially 0.95 V (vs. Li/Li$^+$), that is, not over 2.0 V (vs. Li/Li$^+$). Since lithium ions are doped in advance to a negative electrode and/or a positive electrode so that a positive electrode potential when the positive electrode and negative electrode are short-circuited is 2.0 V (vs. Li/Li$^+$) or less, a lithium ion capacitor having high energy density is obtained.

Comparative Example 1

Producing Method of Positive Electrode 3

On both sides of aluminum expand metal that is 1.0:0.52:0.143 in the LW:SW:W, 38 μm in the thickness, 45% in the aperture ratio and 0.58 mm in the average diameter of inscribed circles of through-holes (produced by Nihon Kinzoku Kogyo K. K.), the slurry of a positive electrode 1 is vertically coated by a die coater at the speed of 1 m/min and molded and dried, thereby a positive electrode 3 of which total thickness after the pressing (a sum total of thicknesses of the positive electrode layers on both sides and a thickness of the expand metal) is 281 μm is obtained.

(Preparation of Cell 2)

Except that the positive electrode 3 is used, similarly to example 1, 4 cells of film type lithium ion capacitors are assembled. Here, lithium metal disposed in the cell is equivalent to 400 mAh/g a weight of the negative electrode active material, and a weight of the positive electrode active material is 1.4 times a weight of the negative electrode active material.

After the cells are left for 20 days after the cells are assembled, when one cell is decomposed, it is found that all of metallithium is completely consumed. From this, it is judged that lithium ions for obtaining electrostatic capacitance of 660 F/g per unit weight of the negative electrode active material are doped in advance. The electrostatic capacitance of the negative electrode amounts to 7.2 times the electrostatic capacitance of the positive electrode.

A cell is charged at a constant current of 2000 mA until a cell voltage becomes 3.6 V, followed by applying, for 1 hr, constant current-constant voltage charge where a constant voltage of 3.6 V is applied. In the next place, discharge is carried out at a constant current of 200 mA until a cell voltage becomes 1.9 V. The 3.6 V-1.9 V cycle is repeated and, at the tenth discharge, cell capacitance and energy density are evaluated. Results are shown in Table 3. The data are average values of three cells.

TABLE 3

| | Capacitance (mAh) | Energy Density (Wh/l) | Internal Resistance (mΩ) |
|---|---|---|---|
| Comparative Example 1 | 182 | 12.0 | 20.2 |

After the measurement came to completion, the positive electrode and negative electrode are short-circuited and a positive electrode potential is measured. The positive electrode potential is found to be substantially 0.95 V (vs. Li/Li$^+$), that is, not over 2.0 V (vs. Li/Li$^+$). Since lithium ions are doped in advance to a negative electrode and/or a positive electrode so that a positive electrode potential when the positive electrode and negative electrode are short-circuited is 2.0 V (vs. Li/Li$^+$) or less, a lithium ion capacitor having high energy density is obtained. However, the internal resistance became a value larger than that of example 1. Furthermore, it is found that a positive electrode in which an electrolytic etched foil where an average diameter of inscribed circles of the through-holes is 100 μm or less is used is faster in the coating speed and excellent in the productivity.

Comparative Example 2

Producing Method of Positive Electrode 4

On both sides of aluminum expand metal that is 1.0:0.52: 0.143 in the LW:SW:W, 38 μm in the thickness, 45% in the aperture ratio and 0.58 mm in the average diameter of inscribed circles of through-holes (produced by Nihon Kinzoku Kogyo K. K.), anon-aqueous carbon-based conductive paint (trade name: EB-815, produced by Acheson (Japan) Ltd.) is coated by means of a spray coating method and dried, thereby, a positive electrode current collector having a conductive layer formed thereon is obtained. A total thickness (sum total of thicknesses of a current collector and a conductive layer) is 52 μm and the through-holes thereof are substantially clogged with the conductive paint. The slurry of a positive electrode 1 is horizontally coated on one surface of the positive electrode current collector by a roll coater at the speed of 2 m/min, followed, after drying, by further horizontally coating on the other surface by a roll coater at the speed of 2 m/min. After drying and pressing, a positive electrode 4 of which total thickness (a sum total of thicknesses of the positive electrode layers on both sides, thicknesses of conductive layers on both sides and a thickness of the expand metal) is 312 μm is obtained.

(Preparation of Cell 3)

Except that the positive electrode 4 is used, similarly to example 1, 4 cells of film type lithium ion capacitors are assembled. Here, lithium metal disposed in the cell is equivalent to 400 mAh/g per weight of negative electrode active material and a weight of the positive electrode active material is 1.4 times a weight of the negative electrode active material.

After the cells are left for 20 days after the cells are assembled, when one cell is decomposed, it is found that all of metal lithium is completely consumed. From this, it is judged that lithium ions for obtaining electrostatic capacitance of 660 F/g per unit weight of the negative electrode active material are doped in advance. The electrostatic capacitance of the negative electrode amounts to 7.2 times the electrostatic capacitance of the positive electrode.

A cell is charged at a constant current of 2000 mA until a cell voltage becomes 3.6 V, followed by applying, for 1 hr, constant current-constant voltage charge where a constant voltage of 3.6 V is applied. In the next place, discharge is carried out at a constant current of 200 mA until a cell voltage becomes 1.9 V. The 3.6 V-1.9 V cycle is repeated and, at the tenth discharge, cell capacitance and energy density are evaluated. Results are shown in Table 4. The data are average values of three cells.

TABLE 4

| | Capacitance (mAh) | Energy Density (Wh/l) | Internal Resistance (mΩ) |
|---|---|---|---|
| Comparative Example 2 | 192 | 12.0 | 9.1 |

After the measurement came to completion, the positive electrode and negative electrode are short-circuited and a positive electrode potential is measured. The positive electrode potential is found to be substantially 0.95 V (vs. Li/Li$^+$), that is, not over 2.0 V (vs. Li/Li$^+$). Since lithium ions are doped in advance to a negative electrode and/or a positive electrode so that a positive electrode potential when the positive electrode and negative electrode are short-circuited is 2.0 V (vs. Li/Li$^+$) or less, a lithium ion capacitor having high energy density is obtained. Furthermore, as the positive electrode current collector, similarly to comparative example 1, aluminum expand metal is used. However, since a conductive layer is formed by a conductive paint, the internal resistance is considerably reduced than that of comparative 1. However, it is found that, since an undercoating process for forming a conductive layer is necessary, the productivity is inferior to that of example 1.

Example 2

Producing Method of Positive Electrode 5

On an aluminum foil having a thickness of 50 μm, which is used in an electrolytic capacitor and provided with irregularity on a surface thereof by means of electrolytic etching, through-holes having a diameter of 50 μm are formed by means of a laser. An average diameter of inscribed circles of the through-holes is 50 μm. An aperture ratio of such an aluminum foil is 30%. The slurry of a positive electrode 1 is horizontally coated on one surface of the porous aluminum foil by a roll coater at the speed of 5 m/min, followed, after molding and drying, by further horizontally coating on the other surface by a roll coater at the speed of 5 m/min. After drying and pressing, a positive electrode 5 of which total thickness (a sum total of thicknesses of the positive electrode layers on both sides and a thickness of the positive electrode current collector) is 295 μm is obtained.

(Preparation of Cell 4)

Except that the positive electrode 5 is used, similarly to example 1, 4 cells of film type lithium ion capacitors are assembled. Here, lithium metal disposed in the cell is equivalent to 400 mAh/g per weight of negative electrode active material, and a weight of a positive electrode active material is 1.4 times a weight of a negative electrode active material.

After the cells are left for 20 days after the cells are assembled, when one cell is decomposed, it is found that all of metal lithium is completely consumed. From this, it is judged that lithium ions for obtaining electrostatic capacitance of 660 F/g per unit weight of the negative electrode active material are doped in advance. The electrostatic capacitance of the negative electrode amounts to 7.2 times the electrostatic capacitance of the positive electrode.

A cell is charged at a constant current of 2000 mA until a cell voltage becomes 3.6 V, followed by applying, for 1 hr, constant current-constant voltage charge where a constant voltage of 3.6 V is applied. In the next place, discharge is carried out at a constant current of 200 mA until a cell voltage becomes 1.9 V. The 3.6 V-1.9 V cycle is repeated and, at the tenth discharge, cell capacitance and energy density are evaluated. Results are shown in Table 5. The data are average values of three cells.

TABLE 5

|  | Capacitance (mAh) | Energy Density (Wh/l) | Internal Resistance (mΩ) |
|---|---|---|---|
| Example 2 | 193 | 12.4 | 9.0 |

After the measurement came to completion, the positive electrode and negative electrode are short-circuited and a positive electrode potential is measured. The positive electrode potential is found to be substantially 0.95 V (vs. $Li/Li^+$), that is, not over 2.0 V (vs. $Li/Li^+$). Since lithium ions are doped in advance to a negative electrode and/or a positive electrode so that a positive electrode potential when the positive electrode and negative electrode are short-circuited is 2.0 V (vs. $Li/Li^+$) or less, a lithium ion capacitor having high energy density is obtained. Furthermore, even when a current collector provided with through-holes formed by laser and having an average diameter of inscribe circles of 50 μm is used, since a simple coating method can be applied and a coating speed can be heightened, the productivity is preferably high.

When a porous foil is used to precisely coat, like a producing method of the positive electrode 3 shown in comparative example 1, a method where by a die coater a current collector foil is flowed in a vertical direction, or, as shown in comparative example 2, a method where, with a conductive paint, according to a vertical coating method by means of a spray coating method or a die coating method, through-holes are once completely clogged with a conductive layer, followed by horizontally coating by means of a comma coater is generally used. However, in this method, a height of a coating machine is restricted by a building and the current collector tends to break owing to self-weight; accordingly, there are disadvantages in that a drying zone cannot be lengthened and the coating speed is slow. On the other hand, in the case where, as shown in examples 1 and 2, a current collector having such a small average diameter of inscribed circles of the through-holes as 0.5 to 100 μm is used, even when a slurry is coated on one surface of the current collector, the slurry does not leak to a backside; accordingly, a comma coater can be used to horizontally coat. Furthermore, since a coating speed can be increased, a desirable effect that the productivity can be considerably improved is obtained. Still furthermore, when the electrolytic etching is used to form through-holes, a surface area of a current collector is increased; accordingly, without forming a conductive layer in advance, a cell low in the internal resistance is more preferably obtained.

Example 3

Producing Method of Negative Electrode 3

A copper foil (produced by Nihon Seihaku K. K.) having a thickness of 18 μm is processed by a laser to form through-holes having an average diameter of inscribed circles of 80 μm and thereby, as negative electrode current collector, a porous copper foil having the aperture rate of 30% is obtained. The slurry of the negative electrode 1 is horizontally coated on one surface of the porous copper foil by a roll coater at a speed of 5 m/min, molded and dried, followed by further horizontally coating on the other surface by a roll coater at a speed of 5 m/min, further followed by drying and pressing, thereby a negative electrode 3 having a thickness (sum total of thicknesses of negative electrode layers on both sides and a thickness of a negative electrode current collector) of a whole negative electrode of 151 μm is obtained.

(Preparation of Cell 5)

Except that the negative electrode 3 is used, similarly to example 1, 4 cells of film type lithium ion capacitors are assembled. Here, lithium metal disposed inside of the cell is equivalent to 400 mAh/g per weight of negative electrode active material, and a weight of a positive electrode active material is 1.4 times a weight of a negative electrode active material.

After the cells are left for 20 days after the cells are assembled, when one cell is decomposed, it is found that all of metal lithium is completely consumed. From this, it is judged that lithium ions for obtaining electrostatic capacitance of 660 F/g per weight of the negative electrode active material are doped in advance. The electrostatic capacitance of the negative electrode amounts to 7.2 times the electrostatic capacitance of the positive electrode.

A cell is charged at a constant current of 2000 mA until a cell voltage becomes 3.6 V, followed by applying, for 1 hr, a constant current-constant voltage charge where a constant voltage of 3.6 V is applied. In the next place, discharge is carried out at a constant current of 200 mA until a cell voltage becomes 1.9 V. The 3.6 V-1.9 V cycle is repeated and, at the tenth discharge, cell capacitance and energy density are evaluated. Results are shown in Table 6. The data are average values of three cells.

TABLE 6

|  | Capacitance (mAh) | Energy Density (Wh/l) | Internal Resistance (mΩ) |
|---|---|---|---|
| Example 3 | 196 | 12.3 | 8.2 |

After the measurement came to completion, the positive electrode and negative electrode are short-circuited and a positive electrode potential is measured. The positive electrode potential is substantially 0.95 V (vs. $Li/Li^+$), that is, equal to or less than 2.0 V (vs. $Li/Li^+$). Since lithium ions are doped in advance to a negative electrode and/or a positive electrode so that a positive electrode potential when the positive electrode and negative electrode are short-circuited is 2.0 V (vs. $Li/Li^+$) or less, a lithium ion capacitor having high energy density is obtained.

When a current collector having a small average diameter of inscribed circles of the through-holes such as 0.5 to 100 μm is used in both of the positive electrode and negative electrode, the productivity of both electrodes is preferably improved.

In the above, the invention is detailed with reference to specific embodiments. However, it is obvious for one skilled in the art that the invention, without deviating from spirit and a range of the invention, can be variously modified and corrected.

The invention is based on Japanese Patent Application (No. 2005-329455) filed on Nov. 14, 2005 and all content thereof is herein incorporated by reference.

INDUSTRIAL APPLICABILITY

A lithium ion capacitor of the invention is very effective as a driving or complementary electric storage source of an electric car, a hybrid electric car and so on. Furthermore, a lithium ion capacitor can be preferably used as well as a driving electric storage source of an electric bicycle, an electric wheel chair or the like, an electric storage source of various energies such as solar energy, wind power generation or the like, or an electric storage source of a home appliance.

The invention claimed is:

1. A lithium ion capacitor, comprising:
   a positive electrode made of a material capable of reversibly doping and dedoping lithium ions and/or anions;
   a negative electrode made of a material capable of reversibly doping and dedoping lithium ions; and
   an electrolytic solution made of an aprotonic organic solvent electrolyte solution of a lithium salt, wherein
   (1) lithium ions are doped in a negative electrode and/or a positive electrode due to an electrochemical contact between the negative electrode and/or positive electrode and a lithium ion supply source,
   (2) a positive electrode potential after the positive electrode and the negative electrode are short-circuited is 2.0 V (vs. Li/Li$^+$) or less, and
   (3) the positive electrode and/or negative electrode has a current collector made of a metal foil that has a number of holes that penetrate through both sides thereof and have an average diameter of inscribed circles of the through-holes of 100 μm or less.

2. The lithium ion capacitor of claim 1, wherein
   a negative electrode active material has electrostatic capacitance per unit weight larger three times or more than that of a positive electrode active material, and
   a weight of the positive electrode active material is larger than that of the negative electrode active material.

3. The lithium ion capacitor of claim 1, wherein
   a current collector is a metal foil that is rendered porous by electrolytic etching.

4. The lithium ion capacitor of claim 1, wherein
   a current collector is a metal foil that is rendered porous by a laser.

5. The lithium ion capacitor of claim 1, wherein
   a positive electrode active material is activated carbon, conductive polymer or polyacene-based organic semiconductor that is a heat-treated material of an aromatic condensation polymer and has a polyacene-based skeleton structure where a ratio of number of hydrogen atoms/number of carbon atoms is in the range of 0.50 to 0.05.

6. The lithium ion capacitor of claim 1, wherein
   a negative electrode active material is graphite, carbon difficult to graphitize or a polyacene-based organic semiconductor that is a heat-treated material of an aromatic condensation polymer and has a polyacene-based skeleton structure where a ratio of number of hydrogen atoms/number of carbon atoms is in the range of 0.50 to 0.05.

* * * * *